United States Patent
Beckford et al.

(10) Patent No.: US 8,423,532 B1
(45) Date of Patent: Apr. 16, 2013

(54) MANAGING DATA INDEXED BY A SEARCH ENGINE

(75) Inventors: Jonah Beckford, Bothell, WA (US); Shi Yao Zhang, Toronto (CA)

(73) Assignee: Amazon Technologies, Inc., Reno, NV (US)

( * ) Notice: Subject to any disclaimer, the term of this patent is extended or adjusted under 35 U.S.C. 154(b) by 287 days.

(21) Appl. No.: 12/891,872

(22) Filed: Sep. 28, 2010

Related U.S. Application Data

(60) Provisional application No. 61/350,545, filed on Jun. 2, 2010.

(51) Int. Cl.
*G06F 17/30* (2006.01)

(52) U.S. Cl.
USPC .......................... 707/711; 707/715; 707/741

(58) Field of Classification Search .................. 707/696, 707/711, 715, 741, E17.002, E17.053, E17.057, 707/E17.083, E17.088, 999.02
See application file for complete search history.

(56) References Cited

U.S. PATENT DOCUMENTS

| | | | |
|---|---|---|---|
| 5,717,919 A * | 2/1998 | Kodavalla et al. | 1/1 |
| 2004/0015468 A1* | 1/2004 | Beier et al. | 707/1 |
| 2008/0104100 A1* | 5/2008 | Richardson et al. | 707/102 |
| 2010/0287143 A1* | 11/2010 | Di Carlo et al. | 707/693 |

* cited by examiner

*Primary Examiner* — Charles Kim
*Assistant Examiner* — Randall Burns
(74) *Attorney, Agent, or Firm* — Thomas | Horstemeyer, LLP

(57) ABSTRACT

Disclosed are various embodiments for managing data indexed by a search engine. A respective identifier from a set of identifiers is assigned randomly in one or more computing devices to each one of a plurality of data records. A set of search queries is provided. A first one of the search queries encompasses all of the set of identifiers. A second search index is generated from a first search index of the data records. The first search index is queried for at most a predetermined number of unmarked ones of the data records using a search query. Each one of a result set of data records that is thereby obtained is inserted into the second search index. The result set of data records is marked in the first search index.

20 Claims, 4 Drawing Sheets

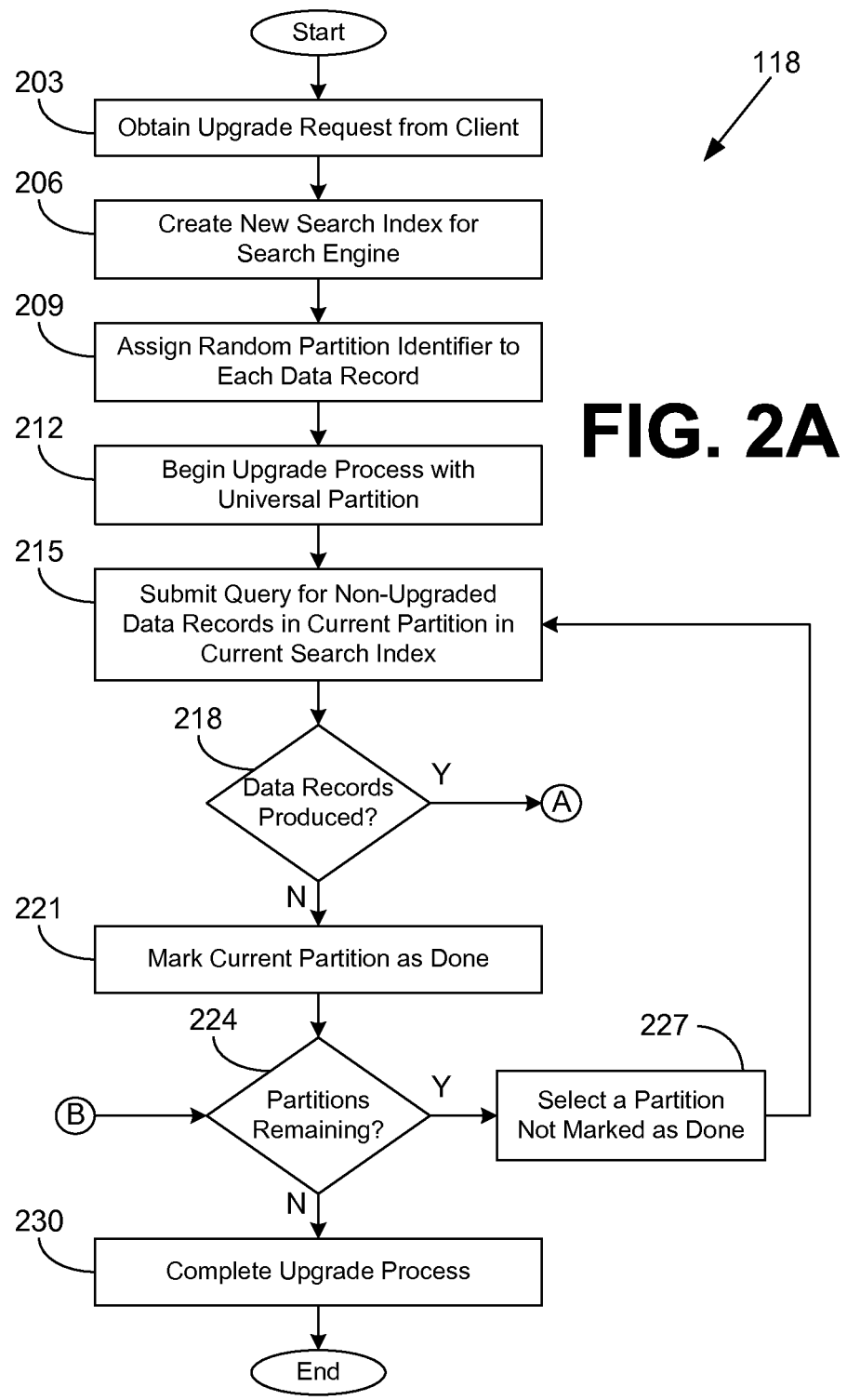

MANAGING DATA INDEXED BY A SEARCH ENGINE

CROSS REFERENCE TO RELATED APPLICATION

This application claims priority to U.S. Provisional Patent Application entitled "Managing Data Indexed by a Search Engine" filed on Jun. 2, 2010 and assigned application No. 61/350,545, which is incorporated herein by reference in its entirety.

BACKGROUND

It may be desirable to have enterprise data indexed by a search engine. A search engine may provide a quick way to locate specific data from within a large data store. Without a search engine, location of such specific data may be impractical. However, the process of indexing data for a search engine may be extremely time intensive. Consequently, an operation that requires the reindexing of data for the search engine may result in downtime.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

FIGS. 2A and 2B show a flowchart illustrating one example of functionality implemented as portions of a data management application executed in a computing device in the networked environment of FIG. 1 according to various embodiments of the present disclosure.

DETAILED DESCRIPTION

The present disclosure relates to managing data indexed by a search engine. Sometimes it may be desirable to modify the schema for data indexed by a search engine. Such modifications, which may be relatively simple in a relational database management system, may prompt a time-intensive reindexing of data for the search engine. Various embodiments of the present disclosure employ two search indices to implement reindexing of the data, where data is retrieved from the first search index and then added to the second search index. The first search index may be accessed while the second search index is being constructed, thereby avoiding prolonged downtime. In the following discussion, a general description of the system and its components is provided, followed by a discussion of the operation of the same.

Figure 1:
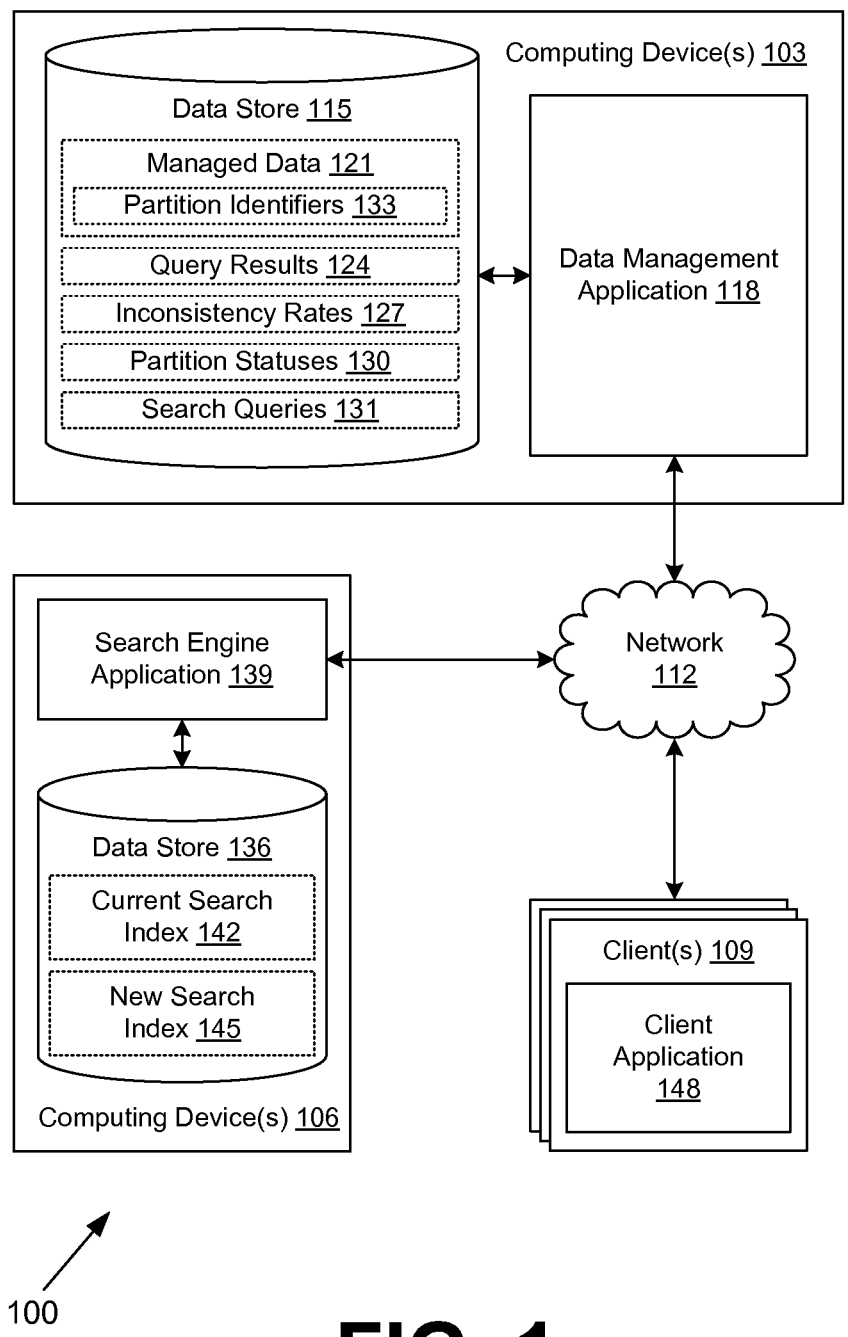
FIG. 1 is a drawing of a networked environment according to various embodiments of the present disclosure.

With reference to FIG. 1, shown is a networked environment 100 according to various embodiments. The networked environment 100 includes one or more computing devices 103, one or more computing devices 106, and one or more clients 109 in data communication by way of a network 112. The network 112 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise, for example, a cloud computing resource, a grid computing resource, and/or any other distributed computing arrangement. Such computing devices 103 may be located in a single installation or may be dispersed among many different geographical locations. For purposes of convenience, the computing device 103 is referred to herein in the singular. Even though the computing device is referred to in the singular, it is understood that a plurality of computing devices 103 may be employed in the various arrangements as described above.

Various applications and/or other functionality may be executed in the computing device 103 according to various embodiments. Also, various data is stored in a data store 115 that is accessible to the computing device 103. The data store 115 may be representative of a plurality of data stores as can be appreciated. The data stored in the data store 115, for example, is associated with the operation of the various applications and/or functional entities described below.

The components executed on the computing device 103, for example, include a data management application 118 and other applications, services, processes, systems, engines, or functionality not discussed in detail herein. The data management application 118 is executed to implement a change in a schema for data indexed by a search engine by obtaining the data currently indexed in a search repository, transforming the data, and indexing the transformed data within a new search repository. The data management application 118 may also manage updates to the data such that the updates are distributed appropriately to the search repository and/or the new search repository.

The data stored in the data store 115 includes, for example, managed data 121, query results 124, inconsistency rates 127, partition statuses 130, active queries 131, and potentially other data. The managed data 121 may be a representation of the data indexed by the search engine for use by the data management application 118. To this end, the managed data 121 may include a local copy of the data indexed by the search engine. The managed data 121 may include partition identifiers 133 from a set of identifiers that are randomly assigned to each data record in the managed data 121. The partition identifiers 133 are configured such that the search engine may be queried for one of the partition identifiers 133 and the data record(s) that are assigned that partition identifier 133 are returned. The partition identifiers 133 may be randomly selected so that the data records of the managed data 121 are approximately uniformly distributed among the partition identifiers 133.

The query results 124 may include data records obtained by the data management application 118 from the search engine for a number of previous search queries. The inconsistency rates 127 describe estimates of a rate of inconsistency pertaining to a result set of data records obtained from a search repository. As a non-limiting example, a search repository may be eventually consistent, and updates to the search repository may take time. Therefore, a result set of data records may include records that have already been upgraded but are not indicated as upgraded. The data management application 118 may be configured to compare the result set of data records with the query results 124 to obtain an estimate of the rate of inconsistency, which may be stored as an inconsistency rate 127. The quality of the estimate may depend, for example, on the quantity of past search results retained in the query results 124. The partition statuses 130 are used by the data management application 118 to indicate which partition identifiers 133 have been processed and which partition identifiers 133 remain to be processed. The search queries 131 track a set of queries that are currently active, where each of the search queries 131 encompasses one or more partition identifiers 133. When a search query 131 encompassing a set of partition identifiers 133 is executed, data records assigned to any one of the set of partition identifiers 133 may be returned.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise, for example, a cloud computing resource, a grid computing resource, and/or any other distributed computing arrangement. Such computing devices 106 may be located in a single installation or may be dispersed among many different geographical locations. For purposes of convenience, the computing device 106 is referred to herein in the singular. Even though the computing device is referred to in the singular, it is understood that a plurality of computing devices 106 may be employed in the various arrangements as described above.

Various applications and/or other functionality may be executed in the computing device 106 according to various embodiments. Also, various data is stored in a data store 136 that is accessible to the computing device 106. In various embodiments, the components executed in the computing device 106 and/or the data stored in the computing device 106 may be executed and/or stored in the computing device 103. The data store 136 may be representative of a plurality of data stores as can be appreciated. The data stored in the data store 136, for example, is associated with the operation of the various applications and/or functional entities described below.

The components executed on the computing device 106, for example, include a search engine application 139 and other applications, services, processes, systems, engines, or functionality not discussed in detail herein. The search engine application 139 is executed to receive search queries and produce search results in response to the search queries. The search engine application 139 may also be executed to receive and commit updates to search repositories and to generate corresponding indices.

The data stored in the data store 136 includes, for example, a current search index 142, a new search index 145, and potentially other data. The current search index 142 corresponds to a current search repository for a current schema that is being superseded. The new search index 145 corresponds to a new search repository being generated by the data management application 118 for a new schema, wherein the data records indexed in the new search index 145 may be transformed in some way from the data records indexed in the current search index 142.

The client 109 is representative of a plurality of client devices that may be coupled to the network 112. The client 109 may comprise, for example, a processor-based system such as a computer system. Such a computer system may be embodied in the form of a desktop computer, a laptop computer, a personal digital assistant, a cellular telephone, set-top box, music players, web pads, tablet computer systems, or other devices with like capability.

The client 109 may be configured to execute various applications such as a client application 148 and/or other applications. The client application 148 may provide an interface to the data management application 118 so as to allow a user to configure a new schema or data record transformation and to initiate the generation of a new search index 145 corresponding to the new schema. In one embodiment, the client application 148 may comprise one or more network pages generated by a network page server application and accessed through a browser application. The client 109 may be configured to execute applications beyond the client application 148 such as, for example, browser applications, email applications, instant message applications, and/or other applications.

Next, a general description of the operation of the various components of the networked environment 100 is provided. To begin, a user at a client application 148 initiates an upgrade or change in a schema for the managed data 121. As a non-limiting example, the managed data 121 may be taken from a table in a relational data store and have a column taking values of either "0" or "1." As a result of the schema change, the column may take the values of either "YES" or "NO." As another non-limiting example, a table may include an additional column, which may be determined from existing data or imported from an external source.

The data management application 118 receives a request to change the schema from the client application 148 over the network 112. In another embodiment, the schema change may be initiated automatically by the data management application 118 without user interaction. The data management application 118 then creates or initializes the new search index 145. In one embodiment, the data management application 118 may have direct access to initialize and/or update the new search index 145 and/or the current search index 142. In another embodiment, the data management application 118 may modify the current search index 142 and/or the new search index 145 indirectly through the search engine application 139.

The data management application 118 randomly assigns partition identifiers 133 to the documents or data records that are to be processed. In one embodiment, the partition identifiers 133 may be preassigned in the current search index 142. As a non-limiting example, the partition identifiers 133 may be assigned by obtaining a random or pseudo-random number and determining the value of that number modulus a predetermined number of partition identifiers 133. As another non-limiting example, an identifying field of the data record may be supplied to a function that generates a number modulus the predetermined number of partition identifiers 133.

The data management application 118 begins populating the new search index 145 by querying the current search index 142 for the data records associated with a search query 131 that encompasses all of the partition identifiers 133. In one embodiment, a maximum number of data records will be returned from the current search index 142 by the search engine application 139, where the maximum number may be less than the total number of data records in the current search index 142 associated with the active search query 131. In various embodiments, the search query may be for at most a predetermined number of data records that is less than the total number of data records in the current search index 142.

A result set of data records is thereby obtained. In various embodiments employing an eventually consistent data store 136, the result set of data records may be filtered to exclude data records that are unmarked but have in fact been previously upgraded as determined, for example, using the query results 124. The data management application 118 then transforms the data records in the result set to conform to the schema change. This transformation may include adding data, removing data, manipulating data, and/or any other type of data record transformation. The transformed versions of the data records are inserted by the data management application 118 into the new search index 145.

The data management application 118 then updates the data records in the result set in the current search index 142 to be marked as upgraded so that the same data records are not processed again. However, the data store 136 may be eventually consistent, meaning that changes to data may not be immediately reflected in subsequent read operations. In other words, a data record that has been marked as upgraded may be identified as unmarked or non-upgraded in a subsequent query. Consequently, the data management application 118 may, in one embodiment, have a local consistent data store 115 to track which data records of the managed data 121 have been previously upgraded.

The process described above may be repeated by the data management application 118 using the active search query 131 until no unmarked data records are returned by the search engine application 139 from the current search index 142. When no unmarked data records are returned by the search engine application 139 from the current search index 142, the data management application 118 may then mark the partition identifiers 133 used in the active search query 131 as processed in the partition statuses 130. The active search query 131 is then removed from the search queries 131. The data management application 118 then may select another search query 131 from the search queries 131. In another embodiment, the data management application may be configured to iteratively select another search query 131 from the search queries 131 after each execution of a search query 131.

The process described above may then be repeated for the newly selected search query 131. If no unprocessed partition identifiers 133 remain, the new search index 145 may then replace the current search index 142 as the search repository for the search engine application 139 to use in answering queries from users.

The result sets from the search queries 131 may be tracked in query results 124 and used in estimating inconsistency rates 127. An inconsistency rate 127 represents a proportion of unmarked data records in a result that have in fact been previously marked. The inconsistency rate 127 for a result set may be an estimate of the actual rate of inconsistency depending on the result sets that are retained in the query results 124. The estimate may, for example, be under the actual rate of inconsistency. The data management application 118 may be configured to weight an intermediate result by a factor in order to better approximate the actual rate of inconsistency before storing the result in the inconsistency rates 127.

The data management application 118 may be further configured to replace an active search query 131 with a first search query 131 and a second search query 131 when the inconsistency rate 127 meets or is below a minimum threshold, where the first search query 131 corresponds to a first bisection of the partition identifiers 133 of the active search query 131 and the second search query 131 corresponds to a second bisection of the partition identifiers 133 of the active search query 131. The data management application 118 may be further configured to replace an active search query 131 with a merged search query 131 when the inconsistency rate meets or exceeds a maximum threshold, where the merged search query 131 is constructed from the partition identifiers 133 of the active search query 131 and the partition identifiers 133 of another search query 131. The partition identifiers 133 of the other search query 131 may be an adjacent subset of the partition identifiers 133 compared to the subset of the partition identifiers 133 associated with the active search query 131.

The minimum and maximum thresholds for the inconsistency rate 127 may be selected based on several factors. As non-limiting examples, the thresholds may be selected based on the randomization of assignment of partition identifiers 133, a bias according to the characteristics of the search engine application 139, a length of time required to index an update to a data record in the current search index 142 or the new search index 145, and/or other factors. Additionally, inconsistency rates 127 from previous queries may be retained and averaged with a current figure to provide an estimate of the rate of inconsistency.

With the replacement of active search queries 131 as described above, the search queries 131 may encompass multiple search queries 131. Ultimately, however, each of the partition identifiers 133 will be processed and each of the active search queries 131 will be merged or removed as producing no data records.

While the new search index 145 is being constructed, modifications or updates to data records may still be processed. How such modifications are processed may be configured by the data management application 118. For example, when an update to a data record is received while the new search index 145 is being constructed, the update may be applied both to the current search index 142 and to the new search index 145. Accordingly, the current search index 142 may be accessed as usual while the generation of the new search index 145 is occurring.

Figure 2B:
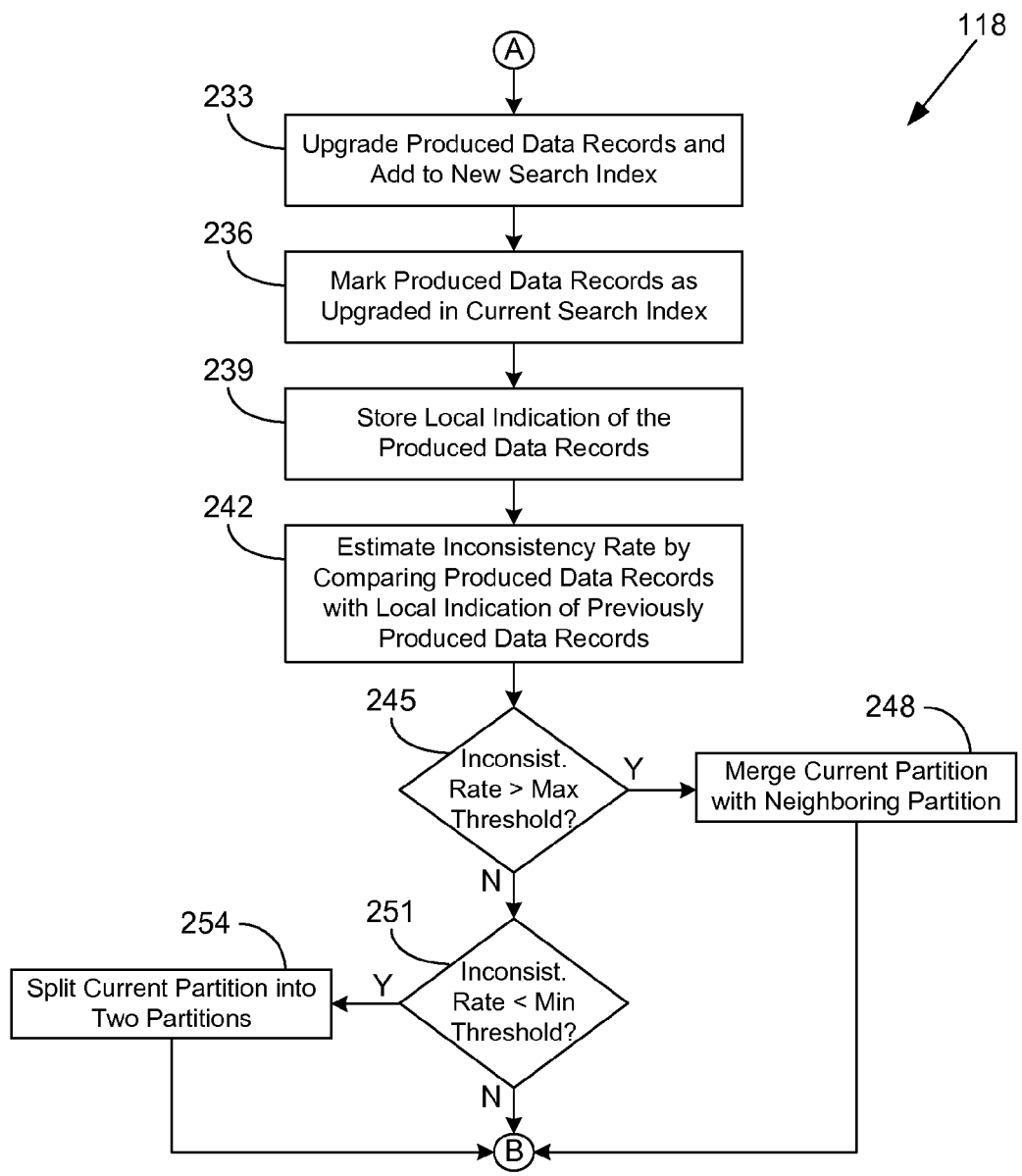

Referring next to FIGS. 2A and 2B, shown is a flowchart that provides one example of the operation of a portion of the data management application 118 according to various embodiments. It is understood that the flowchart of FIGS. 2A and 2B provides merely an example of the many different types of functional arrangements that may be employed to implement the operation of the portion of the data management application 118 as described herein. As an alternative, the flowchart of FIGS. 2A and 2B may be viewed as depicting an example of steps of a method implemented in the computing device 103 (FIG. 1) according to one or more embodiments.

Beginning with box 203, the data management application 118 obtains an upgrade request from a client 109 (FIG. 1) or another system for the managed data 121 (FIG. 1) to be upgraded to a new schema. In box 206, the data management application 118 creates a new search index 145 (FIG. 1) for the search engine. In box 209, the data management application 118 assigns a random partition identifier 133 (FIG. 1) to each data record. Such an assignment may be merely logical, according to an approach that maps an identification of a data record to one of a set of partition identifiers 133. The approach may be selected in order to approximate a uniform distribution of the data records among the partition identifiers 133. In box 212, the data management application 118 begins the upgrade process by using a search query 131 (FIG. 1) encompassing all of the partition identifiers 133. In other words, the search query 131 is mapped to a universal partition.

In box 215, the data management application 118 submits the active search query 131 for non-upgraded data records in the current set of partition identifiers 133 (i.e., a current partition) in the current search index 142 (FIG. 1). In other words, the data management application 118 seeks to obtain data records that have not yet been marked as upgraded. There may be a predetermined limit to the number of data records that may be returned as a result set from a search query 131.

In box 218, the data management application 118 determines whether any data records were produced from the search query 131. If no data records were produced, the data management application 118 proceeds to box 221 and marks the current partition as done. Thus, the partition identifiers 133 embodied by the active search query 131 have been processed, and the active search query 131 is removed from the search queries 131.

In box 224, the data management application 118 determines whether any partitions remain to be processed. In other words, the data management application 118 determines whether any search queries 131 remain. If partitions remain to be processed, the data management application 118 transitions to box 227 and selects a partition not marked as done. That is, the data management application 118 selects the same or another search query 131 from the search queries 131. The data management application 118 then returns to box 215 and submits the search query 131 as described.

If the data management application 118 determines in box 224 that no partitions remain to be processed, the data management application 118 continues to box 230 and completes the upgrade process. For example, the data management application 118 may configure the search engine application 139 to answer queries from the new search index 145 instead of the current search index 142. Thereafter, the data management application 118 ends.

If, instead, the data management application 118 determines in box 218 that data records were produced from the search query 131, the data management application 118 proceeds to box 233 and upgrades the produced data records and adds them to the new search index 145. In box 236, the data management application 118 marks the produced data records as upgraded in the current search index 142. In box 239, a local indication of the produced data records is stored by the data management application 118 in the query results 124 (FIG. 1).

In box 242, the data management application 118 estimates an inconsistency rate 127 (FIG. 1) by comparing the produced data records with a local indication of previously produced data records (i.e., the query results 124). In box 245, the data management application 118 determines whether the inconsistency rate 127 meets or exceeds a maximum threshold. If the inconsistency rate 127 meets or exceeds the maximum threshold, the data management application 118 proceeds to box 248 and merges the current partition with a neighboring partition. In other words, the active search query 131 is merged with another search query 131 representing an adjacent set of partition identifiers 133. The data management application 118 then moves to box 224 to determine whether any partitions remain as described above.

If the inconsistency rate 127 does not meet or exceed the maximum threshold, the data management application 118 moves to box 251 and determines whether the inconsistency rate 127 meets or falls under a minimum threshold. If the inconsistency rate 127 meets or falls under the minimum threshold, the data management application 118 proceeds to box 254 and splits the current partition into two partitions. In other words, the active search query 131 is replaced with a first search query 131 and a second search query 131, with the partition identifiers 133 of the active search query 131 being divided between them. The data management application 118 then moves to box 224 to determine whether any partitions remain as described above. If the inconsistency rate 127 does not meet or fall under the minimum threshold, the data management application 118 continues on to box 224 to determine whether any partitions remain as described above.

Figure 3:
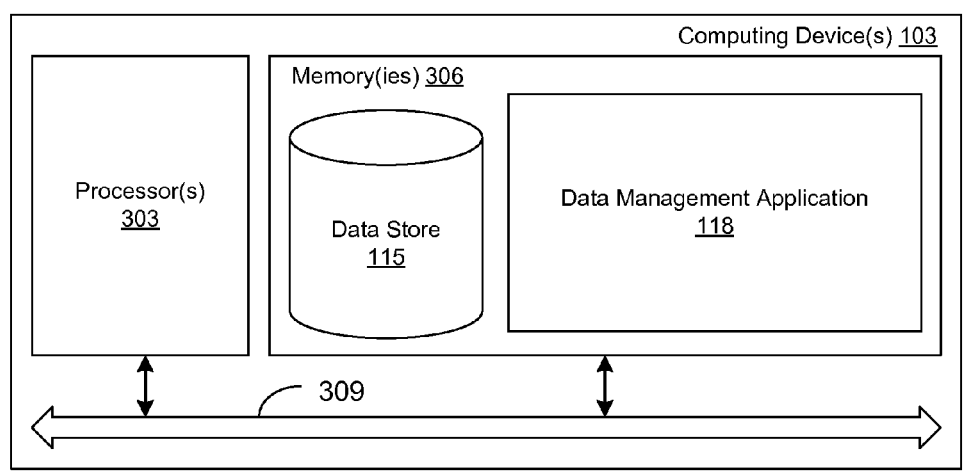
FIG. 3 is a schematic block diagram that provides one example illustration of a computing device employed in the networked environment of FIG. 1 according to various embodiments of the present disclosure.

With reference to FIG. 3, shown is a schematic block diagram of the computing device 103 according to an embodiment of the present disclosure. The computing device 103 includes at least one processor circuit, for example, having a processor 303 and a memory 306, both of which are coupled to a local interface 309. To this end, the computing device 103 may comprise, for example, at least one server computer or like device. The local interface 309 may comprise, for example, a data bus with an accompanying address/control bus or other bus structure as can be appreciated.

Stored in the memory 306 are both data and several components that are executable by the processor 303. In particular, stored in the memory 306 and executable by the processor 303 are the data management application 118 and potentially other applications. Also stored in the memory 306 may be a data store 115 and other data. In addition, an operating system may be stored in the memory 306 and executable by the processor 303.

It is understood that there may be other applications that are stored in the memory 306 and are executable by the processors 303 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 306 and are executable by the processor 303. In this respect, the term "executable" means a program file that is in a form that can ultimately be run by the processor 303. Examples of executable programs may be, for example, a compiled program that can be translated into machine code in a format that can be loaded into a random access portion of the memory 306 and run by the processor 303, source code that may be expressed in proper format such as object code that is capable of being loaded into a random access portion of the memory 306 and executed by the processor 303, or source code that may be interpreted by another executable program to generate instructions in a random access portion of the memory 306 to be executed by the processor 303, etc. An executable program may be stored in any portion or component of the memory 306 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 306 is defined herein as including both volatile and nonvolatile memory and data storage components. Volatile components are those that do not retain data values upon loss of power. Nonvolatile components are those that retain data upon a loss of power. Thus, the memory 306 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 303 may represent multiple processors 303 and the memory 306 may represent multiple memories 306 that operate in parallel processing circuits, respectively. In such a case, the local interface 309 may be an appropriate network 112 (FIG. 1) that facilitates communication between any two of the multiple processors 303, between any processor 303 and any of the memories 306, or between any two of the memories 306, etc. The local interface 309 may comprise additional systems designed to coordinate this communication, including, for example, performing load balancing. The processor 303 may be of electrical or of some other available construction.

Although the data management application 118 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIGS. 2A and 2B shows the functionality and operation of an implementation of portions of the data management application 118. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 303 in a computer system or other system. The machine code may be converted from the source code, etc. If embodied in hardware, each block may represent a circuit or a number of interconnected circuits to implement the specified logical function(s).

Although the flowchart of FIGS. 2A and 2B shows a specific order of execution, it is understood that the order of execution may differ from that which is depicted. For example, the order of execution of two or more blocks may be scrambled relative to the order shown. Also, two or more blocks shown in succession in FIGS. 2A and 2B may be executed concurrently or with partial concurrence. Further, in some embodiments, one or more of the blocks shown in FIGS. 2A and 2B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the data management application 118, that comprises software or code can be embodied in any non-transitory computer-readable medium for use by or in connection with an instruction execution system such as, for example, a processor 303 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. A non-transitory computer-readable medium embodying a program executable in a computing device, the program comprising:

code that assigns an identifier to each of a plurality of data records, the identifiers being randomly selected from a set of identifiers;

code that provides a set of queries for retrieving the data records from a first search index, a first one of the set of queries encompassing all of the set of identifiers; and code that generates a second search index from the first search index by repeatedly:

selecting one of the set of queries as an active query;

querying the first search index for at most a predetermined number of unmarked ones of the data records using the active query, thereby obtaining a result set of data records, the predetermined number of unmarked ones of the data records being less than a total number of the data records indexed by the first search index;

inserting a transformed version of each one of the result set of data records into the second search index;

marking the result set of data records in the first search index;

removing the active query from the set of queries when the result set of data records associated with the active query is empty;

estimating an inconsistency rate by comparing the result set of data records with at least one previously obtained result set of data records, the inconsistency rate representing a proportion of unmarked ones of the result set of data records that have been previously marked;

replacing the active query in the set of queries with a first query and a second query when the inconsistency rate meets a minimum threshold, the first query encompassing a first bisection of a set of identifiers associated with the active query, the second query encompassing a second bisection of a set of identifiers associated with the active query; and replacing the active query in the set of queries with a merged query when the inconsistency rate meets a maximum threshold, the merged query being constructed from a set of identifiers associated with the active query and an adjacent subset of a set of identifiers associated with another query.

2. The computer-readable medium of claim 1, wherein marking the unmarked ones of the data records in the first search index is an eventually consistent operation.

3. A system, comprising:

at least one computing device; and a data management application executable in the at least one computing device, the data management application comprising:

logic that assigns an identifier to each of a plurality of data records, the identifiers being randomly selected from a set of identifiers;

logic that generates a second search index from a first search index of the data records by repeatedly:

querying the first search index for at most a predetermined number of unmarked ones of the data records using a query constructed from the set of identifiers, thereby obtaining a result set of data records, the predetermined number of unmarked ones of the data records being less than a total number of the data records indexed by the first search index;

inserting a transformed version of each one of the result set of data records into the second search index; and marking the result set of data records in the first search index; and wherein the logic that generates the second search index is configured to compare the result set of data records with at least one previously obtained result set of data records to estimate an inconsistency rate, the inconsistency rate indicating a proportion of unmarked ones of the result set of data records that have been previously marked by the logic that generates the second search index.

4. The system of claim 3, wherein the transformed version of a data record includes different data than the data record.

5. The system of claim 3, wherein marking the unmarked ones of the data records in the first search index is an eventually consistent operation.

6. The system of claim 3, wherein the query is constructed to encompass each one of the set of identifiers.

7. The system of claim 3, wherein an execution of the query on the first search index is configured to produce data records that are associated with identifiers in the set of identifiers.

8. The system of claim 3, wherein the logic that generates the second search index is configured to stop using the query when the result set of data records is empty.

9. The system of claim 3, wherein the logic that generates the second search index is configured to replace use of the query with use of a first query and a second query when the inconsistency rate meets a minimum threshold, the first query being constructed from a first bisection of the set of identifiers, the second query being constructed from a second bisection of the set of identifiers.

10. The system of claim 9, wherein the logic that generates the second search index is configured to replace use of the first query with use of a merged query when the inconsistency rate meets a maximum threshold, the merged query being constructed from the first bisection of the set of identifiers and an adjacent subset of the set of identifiers associated with another query.

11. The system of claim 9, wherein the first query and the second query are included in a set of active queries, and the logic that generates the second search index is configured to select the query iteratively from the set of active queries.

12. The system of claim 3, wherein the data management application further comprises logic that applies an update of at least one of the data records to the first search index and to the second search index when the logic that generates the second search index is executing.

13. A method, comprising the steps of:

assigning, in at least one computing device, a respective identifier from a set of identifiers randomly to each one of a plurality of data records;

providing, in the at least one computing device, a set of search queries, a first one of the search queries encompassing all of the set of identifiers;

generating, in the at least one computing device, a second search index from a first search index of the data records by repeatedly, for each one of the set of search queries, executing the steps of:

querying the first search index for at most a predetermined number of unmarked ones of the data records using the one of the set of search queries, thereby obtaining a result set of data records, the predetermined number of unmarked ones of the data records being less than a total number of the data records indexed by the first search index;

inserting each one of the result set of data records into the second search index; and marking the result set of data records in the first search index; and wherein the generating step further comprises the step of estimating an inconsistency rate by comparing the result set of data records with at least one previously obtained result set of data records, the inconsistency rate indicating a proportion of unmarked ones of the result set of data records that have been previously marked.

14. The method of claim 13, wherein marking the unmarked ones of the data records in the first search index is an eventually consistent operation.

15. The method of claim 13, wherein the generating step further comprises the step of removing the one of the set of search queries from the set of search queries when the result set of data records associated with the one of the set of search queries is empty.

16. The method of claim 13, wherein the inserting step further comprises the step of upgrading each data record.

17. The method of claim 13, wherein the generating step further comprises the step of replacing the one of the set of search queries with a first search query and a second search query in the set of search queries when the inconsistency rate meets a minimum threshold, the first search query encompassing a first bisection of a subset of the set of identifiers, the second search query encompassing a second bisection of the subset of the set of identifiers.

18. The method of claim 17, wherein the generating step further comprises the step of replacing the first search query with a merged search query in the set of search queries when the inconsistency rate meets a maximum threshold, the merged search query encompassing the subset of the set of identifiers and an adjacent subset of the set of identifiers associated with another search query from the set of search queries.

19. The method of claim 18, wherein the first query and second query are included in a set of active queries, and the generating step generates the second search index by iteratively selecting the query from the set of active queries.

20. The method of claim 13, further comprising the step of applying an update of at least one of the data records to the first search index and to the second search index while generating the second search index.

* * * * *